(12) United States Patent
Marechal

(10) Patent No.: US 6,355,741 B1
(45) Date of Patent: Mar. 12, 2002

(54) PROCESS FOR PRODUCING POLYOLEFINS

(75) Inventor: Philippe Marechal, Nivelles (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 09/658,068

(22) Filed: Sep. 11, 2000

(30) Foreign Application Priority Data

Sep. 10, 1999 (EP) .......................................... 99117850

(51) Int. Cl.$^7$ ................................................ C08F 2/34
(52) U.S. Cl. ........................... 526/64; 526/65; 526/73; 526/348.2
(58) Field of Search .............................. 526/64, 65, 73, 526/348.2

(56) References Cited

U.S. PATENT DOCUMENTS

| 4,740,550 A |   | 4/1988 | Foster |
|---|---|---|---|
| 5,639,834 A | * | 6/1997 | Debras et al. ................. 526/64 |

FOREIGN PATENT DOCUMENTS

| EP | 0 649 860 A1 |   | 4/1995 |
|---|---|---|---|
| EP | 0 905 153 A1 |   | 3/1999 |
| WO | WO 92/12181 |   | 7/1992 |
| WO | WO 97/13790 | * | 4/1997 |

OTHER PUBLICATIONS

Handbook of Chemistry and Physics, 53th Edition, by Robert C. Weast, The Chemical Rubber Co. 1957, p. D–153.*

* cited by examiner

*Primary Examiner*—David W. Wu
*Assistant Examiner*—William K Cheung
(74) *Attorney, Agent, or Firm*—Hitt Gaines & Boisbrun

(57) ABSTRACT

A process for producing polyolefins having a bimodal molecular weight distribution, the process comprising producing a first polyolefin fraction in the presence of a catalyst in a first loop reactor, and producing a second polyolefin fraction in the presence of the catalyst in a second loop reactor which is serially connected to and downstream of the first loop reactor, the first and second polyolefin fractions being blended in the second loop reactor to form a polyolefin having a bimodal molecular weight distribution, at least the first loop reactor containing a diluent under supercritical conditions which is circulated around the loop of the reactor, and wherein at least the first loop reactor is provided with a fluff concentrating device communicating with the loop and in which polyolefin fluff of the first fraction is concentrated in the supercritical diluent, and polyolefin fluff of the first polyolefin fraction is transferred together with an amount of supercritical diluent from the fluff concentrating device of the first loop reactor into the second loop reactor.

14 Claims, 2 Drawing Sheets

PROCESS FOR PRODUCING POLYOLEFINS

BACKGROUND TO THE INVENTION

The present invention relates to a process for the production of polyolefins, in particular polyethylene or polypropylene. In particular, the present invention relates to the production of a polyethylene having a multimodal molecular weight distribution, for example a bimodal molecular weight distribution.

DESCRIPTION OF THE PRIOR ART

It is known to produce polyethylene in liquid phase loop reactors in which ethylene monomer, and optionally an alpha-olefinic comonomer typically having from 3 to 10 carbon atoms, are circulated under pressure around a loop reactor by a circulation pump. The ethylene monomer and comonomer when present are present in a liquid diluent, such as an alkane, for example isobutane. Hydrogen may also be added to the reactor. A catalyst is also fed to the loop reactor. The catalyst for producing polyethylene may typically comprise a chromium-based catalyst, a Ziegler-Natta catalyst or a metallocene catalyst. The reactants in the diluent and the catalyst are circulated at an elevated polymerisation temperature around the loop reactor thereby producing polyethylene homopolymer or copolymer depending on whether or not a comonomer is present. Either periodically or continuously, part of the reaction mixture, including the polyethylene product suspended as slurry particles in the diluent, together with unreacted ethylene and comonomer, is removed from the loop reactor.

The reaction mixture when removed from the loop reactor may be processed to remove the polyethylene product from the diluent and the unreacted reactants, with the diluent and unreacted reactants typically being recycled back into the loop reactor.

Alternatively, the reaction mixture may be fed to a second loop reactor serially connected to the first loop reactor where a second polyethylene fraction may be produced. Typically, when two reactors in series are employed in this manner, the resultant polyethylene product, which comprises a first polyethylene fraction produced in the first reactor and a second polyethylene fraction produced in the second reactor, has a bimodal molecular weight distribution.

It is known in the art to operate a loop reactor under conditions of high temperature and pressure such that the diluent is present under supercritical conditions. Thus the diluent is at a pressure greater than the critical pressure $P_c$ and at a temperature greater than the critical temperature $T_c$. Under these conditions, there is no thermodynamic transition between the gas phase and the liquid phase and the homogeneous supercritical fluid has the properties of a dense gas and a low density liquid.

For example, WO-A-92/12181 discloses a method for homo- or copolymerising ethene in the presence of a Ziegler-Natta catalyst in a loop reactor under supercritical conditions. The diluent which is in the supercritical state is propane. It is disclosed that the use of a propane phase at a supercritical state provides some advantages, namely that the hydrogen content of the reactor may be adjusted within a wide range and no pressure-shock effects occur which would otherwise tend to damage the circulation pump for the diluent, as a result of the high compressibility of the supercritical fluid. This specification makes clear that propane should be used as a diluent rather than for example isobutane, because the use of propane enables more polymer types to be prepared in the reactor and also the solubility of polyethylene is lower in propane than in isobutane. The specification also discloses that since the boiling point of propane is low, the hydrocarbons may readily be separated from the polymer particles after the polymerisation. The specification discloses that two loop reactors in series may be employed for making ethylene polymers and/or copolymers having a wide or bimodal molecular weight distribution.

EP-B-0517868 also discloses a multi-stage process for producing polyethylene which employs supercritical conditions. It is disclosed that the inert hydrocarbon medium which is employed under supercritical conditions is propane. It is also disclosed that the polyethylene may have a bimodal molecular weight distribution.

WO-A-96/18662 discloses a process for preparing polyethylene which may have a multimodal molecular weight distribution by using supercritical conditions. Again, it is disclosed to be advantageous to use propane as the inert hydrocarbon medium under supercritical conditions.

WO-A-96/34895 discloses a process for manufacturing LLDPE polymers again using propane as a reaction medium under supercritical conditions. The LLDPE polymers are manufactured using a metallocene catalyst. It is disclosed that the excellent polymer morphology of the products produced with the metallocene catalysts together with the low polymer solubility into the diluent and relatively low diluent density, especially in the supercritical conditions, result in very good settling properties of the polymer and thus efficient reactor operation, (i.e. diluent flow into the reactor can be minimised). However, there is no disclosure of any specific reactor structure indicating how the operation of the reactor may be made more efficient.

WO-A-97/13790 discloses a process for making propylene homo- or copolymers in a loop reactor under supercritical conditions. It is disclosed that a polypropylene having a bimodal molecular weight distribution may be employed using two reactors in series.

While the above-specified patent specifications relating to supercritical conditions for the diluent provide advantages of higher hydrogen solubility in the diluent and easier hydrogen flashing if the reaction has been continued in the second reactor, combined with reduced swelling of the polymer in the supercritical diluent and the absence of pressure shocks as a result of the high compressibility of the supercritical diluent, nevertheless, the use of propane as a diluent tends to require the use of comonomers having low carbon numbers, for example butene which militates against the use of high carbon comonomers, for example hexene which would assist in the production of polymers having better properties than if butene were used. Moreover, the use of propane as a diluent tends to require a relatively high pressure to be employed above the critical pressure $P_c$ for propane. Moreover, the supercritical processes referred to hereinabove do not permit a particularly high comonomer concentration to be employed in the reactor, particularly for comonomer with high carbon number, e.g. hexene.

In the manufacture of polyolefins having a bimodal molecular weight distribution under supercritical conditions employed in serially connected reactors, the above-identified specifications suffer from the disadvantage that there is no specific disclosure as to how the reaction medium is transferred from the first reactor to the second reactor.

U.S. Pat. No. 4,754,007 discloses a process for copolymerising ethylene to form LLDPE copolymers in which liquid propane is used as a diluent in a slurry process. It is disclosed that the use of propane diluent provides more economical production of copolymers having more desirable physical properties than slurry processes using isobutane, hexane or other liquid diluents. There is no disclosure of the diluent being under supercritical conditions.

EP-A-0649860 discloses a process for the copolymerisation of ethylene in two liquid full loop reactors in series in which the average molecular weight is regulated. A comonomer is introduced into the first reactor and high and low average molecular weight polymers are produced respectively in the first and second reactors. One or more settling legs is provided for the first reactor in order to transfer the high average molecular weight polymer from the first reactor to the second reactor. The reaction is carried out in a diluent, for example isobutane, in a slurry process. This process suffers from the disadvantage that although the use of settling legs for concentrating the fluff between the first and second reactors allows preferential polymerisation of comonomer in the high molecular weight fraction nevertheless the comonomer amounts in the first and second reactors are rather close because the reactors do not operate substantially independently. It would be desirable to achieve lower $C_6/C_2$ ratios in the second reactor, thereby yielding improved properties for the resultant polyolefin resin.

U.S. Pat. No. 4,740,550 discloses a multi-stage, continuous polymerisation process for the preparation of propylene/ethylene impact copolymers comprising the use of a re-circulating pipe-loop reactor for homopolymerising propylene, a cyclone separator for removing fines, a gas-phase fluidised bed reactor for additional propylene homopolymerisation, and a gas-phase fluidised bed reactor for propylene/ethylene copolymerisation. The essence of the disclosure is that since the first reactor is operated under slurry conditions and the second reactor is operated under gas phase conditions, a hydrocyclone separator is employed to separate the fine particles from the coarse fluff particles that are fed to the gas phase reactor. The slurry phase reactor operates with a liquid diluent and the fine particles are recycled back to the first slurry phase reactor. This process requires the reactors to operate in the liquid and gas phases, and the use of a hydrocyclone which is inconvenient.

EP-A-0905153 discloses a process for producing high density polyethylene in the presence of a Ziegler-Natta catalyst system in two liquid full loop reactors in series. The reactors are both operated with a liquid diluent, for example isobutane. In a first reactor there is substantially homopolymerisation, optionally with a minor degree of copolymerisation, and hydrogen is introduced into the first reactor to achieve the required homopolymerisation. Copolymerisation is carried out in the second reactor. In order to reduce or prevent hydrogen from entering the second reactor, a hydrogenation catalyst is introduced into the reactants downstream of the first reactor. This process requires the use of an additional hydrogenation catalyst.

SUMMARY OF THE INVENTION

The present invention aims at least partially to overcome these problems of the prior art.

Accordingly, the present invention provides a process for producing polyolefins having a bimodal molecular weight distribution, the process comprising producing a first polyolefin fraction in the presence of a catalyst in a first loop reactor, and producing a second polyolefin fraction in the presence of the catalyst in a second loop reactor which is serially connected to and downstream of the first loop reactor, the first and second polyolefin fractions being blended in the second loop reactor to form a polyolefin having a bimodal molecular weight distribution, at least the first loop reactor containing a diluent under supercritical conditions which is circulated around the loop of the reactor, and wherein at least the first loop reactor is provided with a fluff concentrating device communicating with the loop and in which polyolefin fluff of the first fraction is concentrated in the supercritical diluent, and polyolefin fluff of the first polyolefin fraction is transferred together with an amount of supercritical diluent from the fluff concentrating device of the first loop reactor into the second loop reactor.

The polyolefin may comprise polyethylene or polypropylene. When producing polyethylene, the diluent typically comprises at least one $C_1$ to $C_4$ alkane. When producing polypropylene, the diluent typically comprises propylene.

Preferably there is provided a process wherein the fluff concentrating device is selected from one or a combination of a downwardly depending settling leg, a cyclone or hydrocyclone and a centrifuge.

More preferably the fluff concentrating device includes a valve for permitting an amount of the polyolefin fluff together with an amount of the supercritical diluent periodically to be removed from the fluff concentrating device.

In one preferred aspect there is provided a process wherein the diluent in the second loop reactor is operated under supercritical conditions and the second loop reactor is provided with a respective fluff concentrating device.

More preferably there is provided a process further comprising recycling back into the first and second loop reactors any diluent removed from the fluff concentrating device of the second loop reactor on removal of polyolefin fluff therefrom.

In another preferred aspect there is provided a process wherein the diluent in the second loop reactor is operated under liquid conditions and the second loop reactor is provided with a respective fluff concentrating device.

The present invention further comprises the use, in a pair of serially connected loop reactors for polymerising an olefin in the presence of a catalyst to produce a polyolefin having a bimodal molecular weight distribution and including a first polyolefin fraction produced in a first loop reactor and a second polyolefin fraction produced in a second loop reactor downstream of the first loop reactor, of a diluent under supercritical conditions in at least the first loop reactor for increasing the settling of polyolefin fluff in a respective fluff concentrating device of at least the first loop.

The present invention yet further provides the use, in a pair of serially connected loop reactors for polymerising ethylene in the presence of a catalyst to produce polyethylene having a bimodal molecular weight distribution and including a first polyethylene fraction comprising polyethylene copolymer produced in a first loop reactor and a second polyethylene fraction comprising polyethylene homopolymer produced in a second loop reactor downstream of the first loop reactor, of a diluent under supercritical conditions in at least the first loop reactor for reducing the amount of comonomer in solution in the diluent transferred from the first loop reactor to the second loop reactor.

The present invention also provides the use in a pair of serially connected loop reactors for polymerising ethylene in the presence of a catalyst to produce polyethylene having a bimodal molecular weight distribution and including a first polyethylene fraction comprising polyethylene homopolymer produced in a first loop reactor and a second polyethylene fraction comprising polyethylene copolymer produced in a second loop reactor downstream of the first loop reactor, of a diluent under supercritical conditions in at least the first loop reactor for reducing the amount of hydrogen in solution in the diluent transferred from the first loop reactor to the second loop reactor.

The present invention still further provides the use, in a pair of serially connected loop reactors for polymerising an olefin in the presence of a catalyst to produce a polyolefin having a bimodal molecular weight distribution and including a first polyolefin fraction produced in a first loop reactor and a second polyolefin fraction produced in a second loop reactor downstream of the first loop reactor, of a diluent under supercritical conditions in the first and second loop reactors for reducing the amount of diluent to be recycled back into the loop reactors following removal of a mixture of polyolefin fluff and diluent from a fluff concentrating device of the second loop reactor.

Through this process the second reactor is made more independent from the first one.

BRIEF DESCRIPTION OF THE DRAWINGS

An embodiment of the present invention will be described, by way of example only, with reference to the accompanying drawings, in which.

DETAILED DESCRIPTION OF THE PREFERRED EMBODIMENTS

Figure 1:
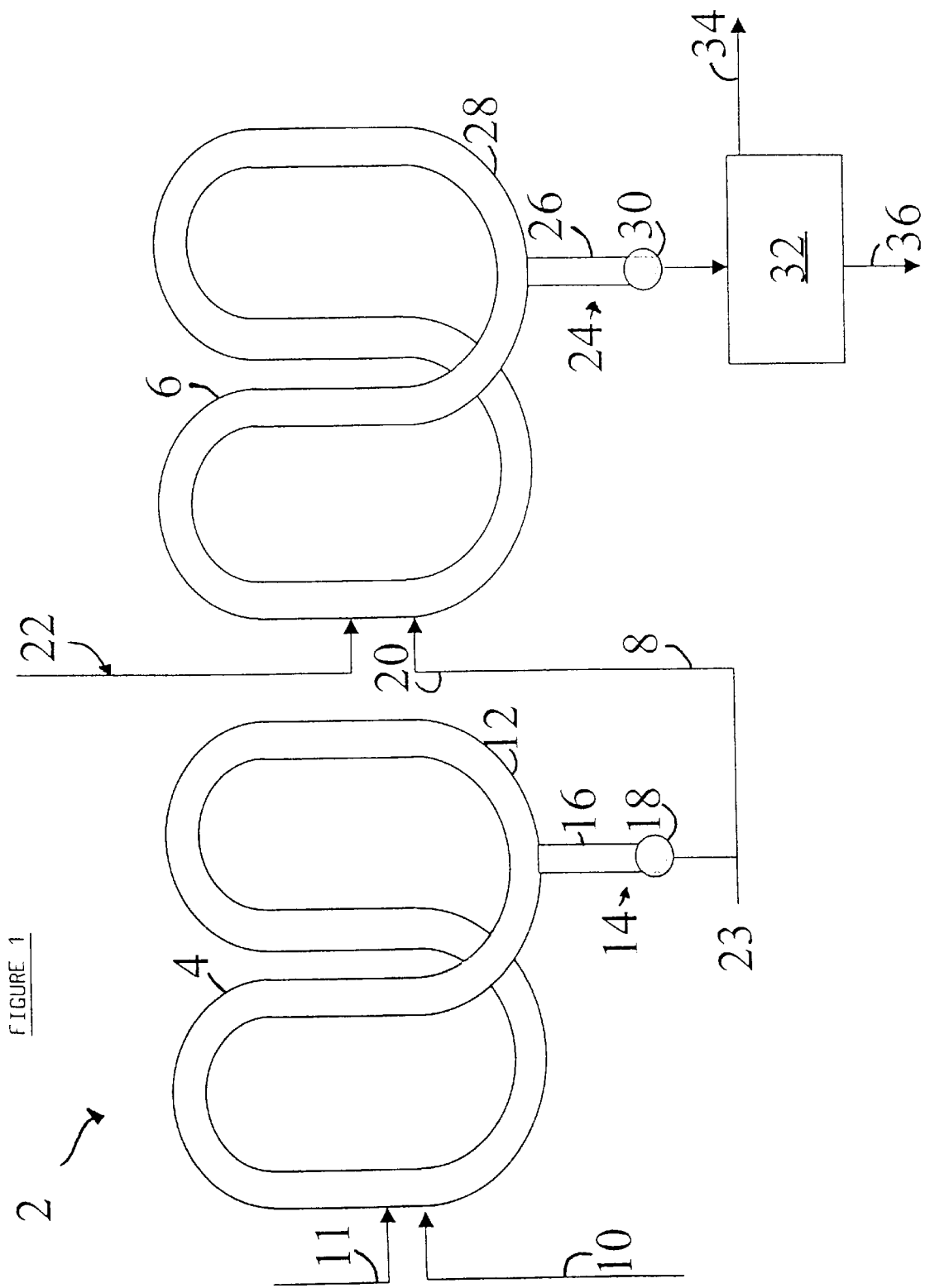
FIG. 1 is a schematic diagram of a pair of serially connected loop reactors for performing a method for producing polyethylene in accordance with an embodiment of the present invention.

Referring to FIG. 1, there is shown an apparatus designated generally as 2, for the production of a polyolefin, in particular polyethylene. The apparatus 2 comprises a first loop reactor 4 and a second loop reactor 6 serially connected thereto by a conduit 8. The first loop reactor 4 includes an inlet port 10 from which ethylene monomer and where appropriate comonomer, such as hexene, and hydrogen, and diluent are fed into the first loop reactor 4. A port 11 is provided for introducing a catalyst, for example a chromium-based catalyst, into the reactor 4. The chromium-based catalyst may be employed together with a cocatalyst. Alternative catalysts are Ziegler-Natta catalysts together with a cocatalyst, metallocene catalysts together with a cocatalyst, and late transition metal catalysts together with a cocatalyst. All these catalysts may be pre-polymerised to a level of up to 10 gram of polyethylene per gram of the catalyst. The diluent may comprise an alkane, such as a $C_1$–$C_4$ alkane or a mixture thereof or an olefin monomer, such as propylene for the production of polypropylene. Separate inlet ports may be provided for each constituent. The first loop reactor 4 is provided with a pump (not shown) for circulating diluent containing the reactants and the catalyst around the first loop reactor 4. The first loop reactor 4 is also provided at a bottom portion 12 thereof with an outlet port, designated generally as 14, which is provided with a fluff concentrating device which comprises a downwardly depending settling leg 16 and a valve 18 at the bottom of the settling leg 16. The output side of the valve 18 connects with the conduit 8. The output side of the conduit 8 comprises an inlet port 20 for the second loop reactor 6. A plurality of additional inlets, designated generally as 22, are provided through which, if desired, additional monomer and diluent, and optionally comonomer and/or hydrogen may be fed for introduction into the second loop reactor 6. When supercritical diluent is used in the first reactor 4 in accordance with the invention, the settling in the reactor 4 can be so high that an additional feed of diluent is necessary to push the fluff from the outlet 18 of the concentrating device 14 of the first reactor 4 to the second reactor 6. This additional feed is the total or a part of the diluent and monomer feed to the second loop reactor. Thus some of these additional components may be fed via an inlet 23 in the conduit 8 for assisting in transforming the polyethylene fluff through the conduit 8 into the second loop reactor 6. The second loop reactor 6, like the first loop reactor 4, is provided with a pump (not shown) for circulating the diluent containing the reactants and the catalyst around the second loop reactor 6. The second loop reactor 6 is, like the first loop reactor 4, provided with an outlet port designated generally as 24, which is provided with a fluff concentrating device which comprises a downwardly depending settling leg 26 extending from a bottom portion 28 of the second loop reactor 6 and a valve 30 at the bottom of the settling leg 26.

The settling legs 16,26 act to concentrate the polyethylene fluff before it leaves the reactor 4,6. The settling leg 16,26 may be vertical or inclined to the vertical, for example at an angle less than 87°, more preferably less than 60°, to the vertical. The settling legs 16,26 may be additionally or alternatively be provided at an external edge of an elbow or bent part of the reactors 4,6, for example in a tangential orientation so as to form a tangential fluff removal pipe for continuous or discontinuous (e.g. periodic) evacuation of polyethylene fluff from one or several lines of the reactor 4,6.

The fluff concentrating device may alternatively comprise a hydrocyclone or a centrifuge. In other embodiments the fluff concentrating device may comprise a combination of two or more of a settling leg, a hydrocyclone and a centrifuge. For example, a centrifuge may be located downstream of a settling leg/valve assembly. In a particularly preferred embodiment, the outlet of the settling leg of the first loop reactor communicates with a centrifuge. The centrifuge is fed additionally with part or all of the diluent feed for the second reactor. The centrifuge outputs recycled diluent to the first reactor and fluff and diluent feed to the second reactor.

In the first loop reactor 4, in one particular mode of operation for producing polyethylene copolymer, ethylene, comonomer, typically hexene, hydrogen and the chromium-based catalyst are introduced with the diluent, which typically comprises at least one $C_1$–$C_4$ alkane, preferably a mixture of $C_1$–$C_4$ alkanes with propane as a major component, into the first loop reactor 4 via the inlet ports 10 and 11 as described above. The diluent typically comprises propylene when producing polypropylene. The ethylene and the hexene comonomer and also hydrogen when present are dissolved in the diluent. The diluent is under supercritical conditions, i.e. at a pressure above the critical pressure $P_c$, and at a temperature above the critical temperature $T_c$. Typically, the first loop reactor 4 is operated under supercritical conditions at a pressure of from 37 to 100 bars and at a temperature of from 70 to 140° C., more preferably from 80 to 110° C. for polyethylene or from 60° C. to 100° C. for polypropylene with a Ziegler-Natta catalyst and from 50 to 140° C. with a metallocene catalyst.

As the ethylene copolymerisation reaction proceeds, polyethylene in the form of fluff is formed in the first loop reactor 4 and progressively builds up in the settling leg 16 at the bottom portion 12 of the first loop reactor 4. The polyethylene fluff settles in the settling leg 16 under the action of gravity. Periodically, for example around every 30 seconds, the valve 18 is opened to permit the polyethylene fluff (comprising a copolymeric first polyethylene fraction of the eventual polyethylene resin) to be drawn off from the first loop reactor 4 through the conduit 8 and fed into the second loop reactor 6 via the inlet port 20. An amount of the diluent, together with ethylene and comonomer and hydrogen dissolved therein, is also inevitably transferred on opening of the valve 18 from the first loop reactor 4 to the second loop reactor 6, as a result of incomplete packing of the polyethylene fluff and because the removed volume from the settling leg tends to include at the top thereof a layer of diluent with unsettled fluff.

In the second loop reactor 6, a homopolymeric second polyethylene fraction is produced. The second polyethylene fraction, together with the first polyethylene fraction, progressively settles in the settling leg 26 at the bottom portion 28 of the second loop reactor 6 under the action of gravity. The valve 30 is periodically opened to permit the polyethylene resin, comprising the blend of the first and second polyethylene fractions, to be removed from the apparatus. Removal of the polyethylene resin from the settling leg 26 inevitably removes additionally some diluent from the second loop reactor 6, the diluent having reactants dissolved therein. The discharged mixture is sent to a separator 32 where the polyethylene resin fluff is separated from the diluent, which is then recycled along a line 34. The polyethylene resin is recovered via an outlet 36 of the separator 32.

In the illustrated embodiment, both the first and second reactors are operated under supercritical conditions. However, the second reactor may be operated under liquid or supercritical conditions. Also, in the illustrated embodiment, the first supercritical reactor is employed to produce the high molecular weight polyolefin fraction and the second supercritical or subcritical reactor is employed to produce the low molecular weight polyolefin fraction. In alternative arrangements, the first and second reactors may instead produce respectively the low and high molecular weight fractions.

In accordance with the invention, the use of supercritical conditions for the diluent enables significantly more efficient polyethylene fluff removal from each of the first and second loop reactors 4,6 which is operated under supercritical conditions. To increase the process efficiency it is desired to remove a maximum amount of polyethylene fluff with a minimum amount of diluent, together with any reactants dissolved therein, from the respective settling leg 16,26 of the first and second loop reactors 4,6. In accordance with the invention, it has been found that the use of supercritical conditions for the diluent in conjunction with a settling leg of the loop reactor, wherein the settling of the polyethylene fluff occurs under the action of gravity, is significantly increased as compared to the use of a liquid diluent not under supercritical conditions.

For the settling of polyethylene fluff, the settling speed is determined by the difference between the downwardly directed gravitational force acting on the polyethylene fluff particles suspended in the diluent and the upwardly directed viscous force of the diluent acting on the polyethylene fluff as it falls downwardly under the action of gravity. The gravitational force is in turn dependent on the difference in density between the polyethylene resin and the diluent. The use of a supercritical diluent significantly reduces the density of the diluent as compared to the liquid phase. Typically, for isobutane the density of the isobutane under supercritical conditions is around one third to one half of the density of the same diluent under liquid conditions. Moreover, the viscosity of the diluent under supercritical conditions is significantly reduced as compared to the viscosity of the diluent when under subcritical conditions. For example, for isobutane, the diluent viscosity under supercritical conditions is around one tenth of the diluent viscosity when under subcritical conditions. Thus the viscous force which tends to resist settling of the polyethylene fluff is significantly less under supercritical conditions than under subcritical conditions. Moreover, the density difference between the polyethylene and the diluent is significantly increased under supercritical conditions as compared to under subcritical conditions. For example, when the diluent is isobutane, typically the density difference between the polyethylene and the diluent under supercritical conditions is around 0.65 g/cc whereas the density difference between the polyethylene and the diluent under subcritical conditions is only around 0.35 g/cc.

The increased density difference under supercritical conditions tends to increase the gravitational force acting on the polyethylene fluff, which in turn tends to increase the settling speed. Typically, the settling speed for isobutane as a diluent is around 20 times faster under supercritical conditions than under subcritical conditions. This greatly increases the build-up of fluff in the settling legs of the loop reactors, leading to a higher rate of recovery of polyethylene resin from the apparatus. As a result of the increase settling speed, satisfactory settling of the polyethylene fluff is achieved even with relatively fine fluff particles which otherwise would not settle rapidly enough to be recoverable efficiently. In addition, the supercritical diluent tends to increase the degree of packing of the fluff particles building up in the settling legs 16,26. Typically, the maximum packing or settling under supercritical conditions is around twice that achievable under subcritical conditions. In view of the increased settling in the settling leg 16,26, for any given volume of material removed from the respective settling leg 16,26 on opening of the respective valve 18,30, that given volume tends to include a smaller amount of diluent under supercritical conditions as compared to under subcritical conditions.

Figure 2:
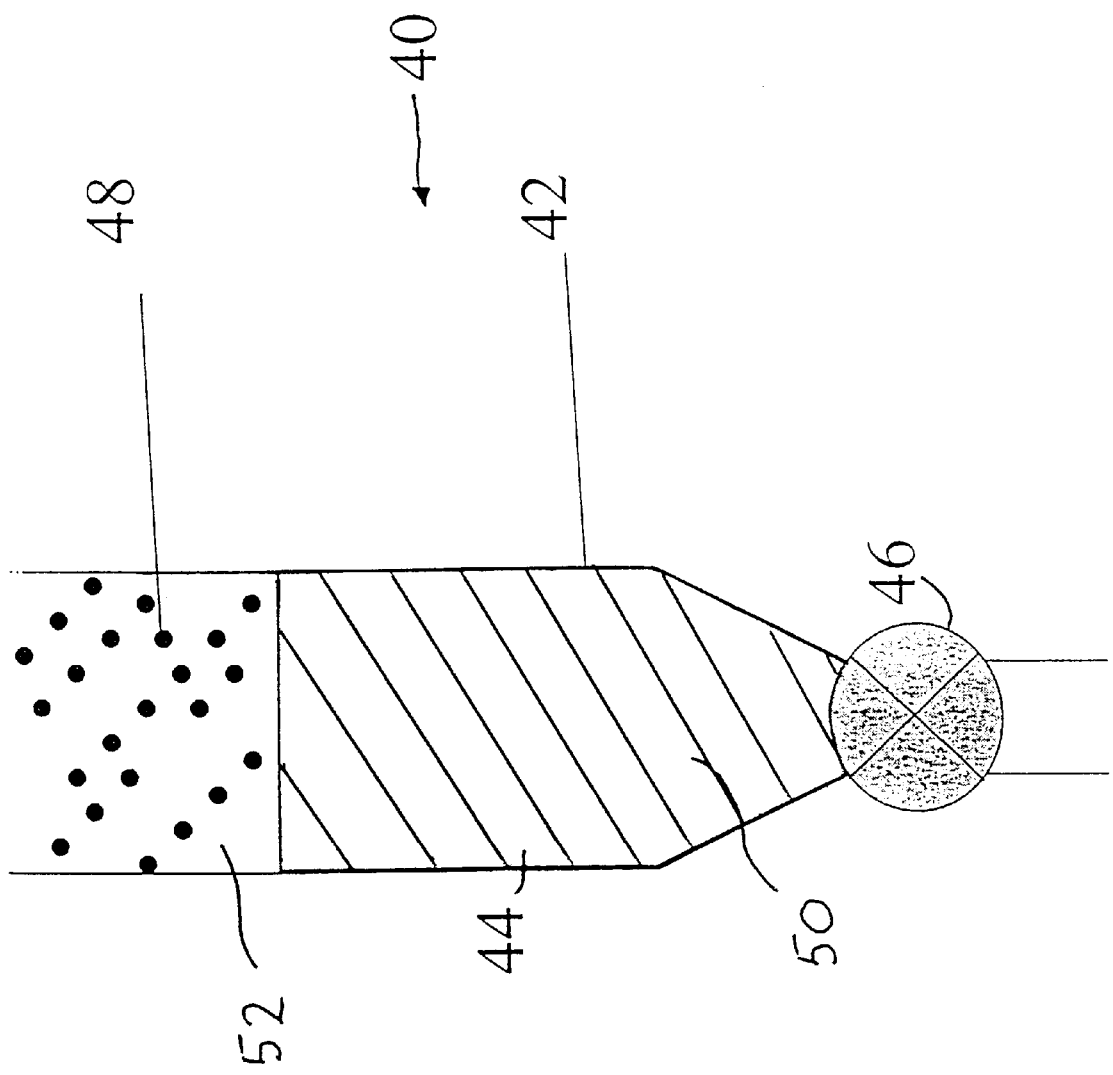
FIG. 2 is an enlarged schematic diagram of a settling leg and valve assembly of each loop reactor of the apparatus of FIG. 1 showing settling of the polyethylene therein.

FIG. 2 shows a diagrammatic representation of a settling leg and a valve assembly of a loop reactor, which may be the settling leg 16,26 of both of the first and second loop reactors 4,6. The settling leg 40 includes a tubular wall 42 defining an upwardly extending chamber 44 above the valve 46. The polyethylene fluff 48 settles in the bottommost part 50 of the chamber 44 and progressively the volume of the settled polyethylene fluff grows upwardly, thereby displacing the diluent 52. For any given volume of material downwardly released through the valve 46 from the settling leg 40, under subcritical conditions not in accordance with the invention, the given volume typically comprises around 60% by weight of polyethylene fluff 48 and 40% by weight of the diluent 52, which may have the ethylene monomer and comonomer dissolved therein. In contrast, under supercritical conditions, as a result of the faster settling and increased packing of the polyethylene fluff 48 at the bottom of the settling leg, the same volume typically may comprise around 80% by weight of polyethylene and around 20% by weight of the supercritical diluent 52. Accordingly, in order to remove a given amount of polyethylene fluff from either of the first and second loop reactors 4,6, significantly less diluent is additionally removed with the polyethylene resin under supercritical conditions as compared to under subcritical conditions.

Accordingly, with regard to the settling leg 16 of the first loop reactor 4, for transferring a given amount of polyethylene fluff from the first loop reactor 4 to the second loop reactor 6, a significantly reduced volume is transferred under supercritical conditions as compared to under subcritical conditions. The lower density of the diluent under supercritical conditions as compared to under subcritical conditions also means that for any given volume of diluent transferred from the loop reactor 4 to the second loop reactor 6, resulting from transferring the polyethylene fluff from the first loop reactor 4 to the second loop reactor 6, a considerably reduced weight of the diluent is accordingly transferred from the first loop reactor 4 to the second loop reactor 6 for any given amount of polyethylene fluff transferred. Accordingly, this results in a smaller amount in weight of the supercritical fluid being required to transfer a given amount of polyethylene from the first loop reactor 4 to the second loop reactor 6. Since there is a reduced amount of diluent transferred from the first loop reactor 4 to the second loop reactor 6 for any given amount of polyethylene transferred, if comonomer and/or hydrogen is present in the first loop reactor 4, then less comonomer and/or less hydrogen is transferred from the first loop reactor 4 to the second loop reactor 6 in solution in the diluent under supercritical conditions than under subcritical conditions. This thus largely enhances the independence of the two reactors.

When the first and second loop reactors 4,6 are employed to produce a polyethylene resin having a bimodal molecular weight distribution, a low density fraction is produced in the first loop reactor 4 as a result of high comonomer incorporation to produce a low density high molecular weight first polyethylene resin fraction, whereas in the second loop reactor 6 a high density low molecular weight polyethylene resin homopolymer fraction is produced with no comonomer being deliberately introduced into the second loop reactor 6. Since for any given amount of the first polyethylene fraction transferred from the first loop reactor 4 to the second loop reactor 6 less diluent is transferred, accordingly less comonomer, which is dissolved therein, is also transferred, thereby leading to improved homopolymerisation in the second reactor as a result of reduced comonomer incorporation.

Thus the improved settling of the polyethylene fluff in the first loop reactor 4 tends to provide reduced comonomer transfer from the first loop reactor 4 to the second loop reactor 6. This in turn enables a larger difference in density to be achieved between the relatively low density copolymer fraction produced in the first loop reactor 4 and the relatively high density homopolymer fraction produced in the second loop reactor 6, with the density of the final composite resin being selected as a desired value. This yields a composite polyethylene resin which has improved mechanical properties. Furthermore, since less diluent is transferred from the first loop reactor 4 to the second loop reactor 6 for any given amount of polyethylene transferred, less impurities tend to be transferred from the first loop reactor 4 to the second loop reactor 6. This improves the homogeneity of the polyethylene resin by maximising the activity of the catalyst grains in the second reactor.

Accordingly, in accordance with the invention the use of supercritical conditions for the diluent in a loop reactor having a settling leg tends to increase the capacity of the reactor because for the same compressor capacity circulating the reactants around the loop, significantly more polyethylene can be removed from the reactor as a result of improved settling of polyethylene fluff in the settling leg. This enhanced settling provides increased reactor throughput. The reactor can be provided with a reduced number of settling legs, reducing the capital cost of the reactor.

In addition, since for any given amount of polyethylene fluff removed from the settling leg a reduced amount of diluent is also removed under supercritical conditions as compared to subcritical conditions, there is a reduced amount of diluent having monomer and possibly comonomer, incorporated therein for recycling back to the loop reactor. The use of supercritical conditions for a diluent in a loop reactor with a settling leg also greatly increases the recycling economy of the reactor system. Furthermore, the reduced amount of diluent also reduces the amount of impurities and poisons in the reactors which enhances catalyst activity.

The improved settling speed and packing of the fluff particles in the settling leg as a result of the use of supercritical conditions for the diluent tends to enable settlement to be achieved with smaller fluff particles. Such small fluff particles can be used directly for rotational moulding. There is a lower swelling tendency for the polyethylene fluff. The fluff can be processed at higher temperatures, and has improved degassing. Furthermore, the achievement of reliable and efficient settling of smaller fluff particles tends to permit the use of correspondingly smaller catalyst particles, with corresponding higher catalyst activity. This increases the efficiency of the polymerisation process.

The reduced viscosity of the supercritical diluent as compared to the subcritical diluent tends to permit a higher diffusion rate of comonomer through the diluent, in turn leading to a higher comonomer incorporation in the copolymer. The comonomer incorporation is more homogeneous. The higher comonomer incorporation permits a lower comonomer/monomer ratio to be required in the reactor, which again reduces the trend to swelling (i.e. the tendency for the polyolefin to dissolve in the diluent).

In manufacturing the bimodal polyethylene resin in the two loop reactors in series, in order to improve the mechanical properties of the resin it is desirable to have a large density difference between the two fractions produced in the two reactors, and this is achieved by copolymerising ethylene and the comonomer in the first loop reactor, and homopolymerising ethylene, in the substantial absence of comonomer, in the second loop reactor. Improved settling of the polyethylene fluff in the first loop reactor reduces the amount by weight of the supercritical fluid needed to transfer a given amount of polyethylene from the first loop reactor to the second loop reactor, thus in turn reducing the comonomer transfer to the second loop reactor from the first loop reactor, the comonomer being dissolved in the diluent. Alternatively, the reduced comonomer transfer allows an increase in the fraction of the low density portion for any prescribed final density of the polyethylene fluff. Thus the use of a supercritical diluent in the first reactor increases the decoupling or independence of the polymerisation reaction occurring in the loop reactors. This broadens the range of polymer products which can be produced by the two serially connected reactors.

For example, for two loop reactors in series operating not in accordance with the invention under subcritical conditions for the liquid diluent comprising isobutane, the weight ratio in the first loop reactor of the isobutane to ethylene feed is typically around 1.5 and the isobutane has dissolved therein around 1 wt % ethylene and 5 wt % hexene as comonomer giving a hexene/ethylene weight ratio of 5. Typically, for a commercial reactor around 75 kg comonomer are removed from the first loop reactor for every ton of polyethylene removed from the first loop reactor. In the second loop reactor under subcritical conditions, the weight ratio of diluent to ethylene feed is around 1. The ethylene concentration in the diluent is around 2 wt %. No additional comonomer is introduced into the second loop reactor but the hexene comonomer is transferred into the second loop reactor together with the diluent from the first loop reactor. Typically, the hexene concentration is around 0.5 wt % giving a hexene/ethylene feed weight ratio of around 0.25. This amount of hexene in the second loop reactor means that some hexene is incorporated into the polyethylene fraction produced in the second loop reactor, thereby reducing the homopolymeric nature of the second polymeric fraction.

In contrast, when the same apparatus comprising serially connected first and second loop reactors is operated under supercritical conditions, as a result of the reduced density of the supercritical diluent as compared to the liquid diluent, the density of the supercritical diluent being typically around one third to one half that of the liquid diluent, the weight ratio of diluent to ethylene feed in the first loop reactor is typically around 0.3 to 0.5. The ethylene and hexene concentrations in the first loop reactor and accordingly the hexene/ethylene feed weight ratio, are the same or lower as for the reactor when operated with liquid diluent as described above.

However, as a result of the cumulative effect of the improved settling of the polyethylene fluff in the first loop reactor and the reduced weight of any given volume of the diluent under supercritical conditions as a result of the reduced density thereof, typically only around 15 kg of comonomer are transferred per ton of polyethylene from the first loop reactor to the second loop reactor. This in turn typically reduces the amount of comonomer transferred from the first loop reactor to a second loop reactor by a factor of 5.

Accordingly, in the second loop reactor, the hexene comonomer is present in an amount of only around about 0.1 wt % and the ethylene monomer is present in the same amount of around 2 wt %, yielding a hexene/ethylene weight ratio in the second loop reactor of only around 0.05%. This is considerably reduced when the diluent is under supercritical conditions as compared to when the diluent is under liquid conditions. Ideally, the hexene/ethylene weight ratio is zero for production of a pure homopolymer. The reduced amount of comonomer in the second loop reactor permits an increase in the density difference between the two polyethylene fractions.

In the second loop reactor when operated under supercritical conditions, improved settling of the polyethylene fluff reduces the amount of diluent which is required to be removed together with the polyethylene resin from the second loop reactor.

The improved settling of the polyolefin fluff means that less diluent is removed from the reactors for any given amount of polyolefin fluff recovered which in turn reduces the amount of material required to be recycled back to the first and second loop reactors. Typically, the amount of diluent recycled back to the loop reactors under supercritical conditions is around one half that as compared to under liquid conditions.

The improved settling of the polyethylene fluff enables very fine fluff to be produced and recovered in the first or second loop reactor. This in turn broadens the range of catalysts which may be employed in the polymerisation process. Furthermore, the improvement in settling of the polyethylene fluff increases the productivity of the first and second loop reactors because of the need of shorter residence times of the reactants in the reactor. Furthermore, since the supercritical fluid has a lower density than the supercritical liquid, the polyethylene fluff has a lower solubility in the supercritical fluid as compared to in the liquid diluent. This lower solubility enables higher polymerisation temperatures to be employed before considerable solubilising of the polyethylene in the diluent occurs. Accordingly, it is possible with the use of supercritical diluent to polymerise at a higher polymerisation temperature than for a liquid diluent. This in turn provides greater catalyst activity. These two phenomena result in a cumulative increase in the productivity of the production of polyethylene using supercritical fluid as compared to a liquid diluent.

Furthermore, by working at a high pressure with the supercritical fluid, this allows the hydrogen and ethylene concentrations in the supercritical diluent to be increased, thereby increasing the polymerisation rate for the production of polyethylene. For example, under supercritical conditions, in the first loop reactor the hydrogen may be present in around 2. vol % and in the second loop reactor the hydrogen may be present in around 0.1 vol %, yielding a hydrogen volume ratio for the two reactors of 20. In contrast, under subcritical conditions with a liquid diluent in the first loop reactor, which is designed for use under subcritical conditions, the hydrogen content is required to be lower, typically around 1 vol %, as a result of the lower design pressure of the reactor and in the second loop reactor the hydrogen may still be present in around 0.1 vol %, giving a lower hydrogen volume ratio for the two reactors of 10. Reduced hydrogen transfer from the first loop reactor to the second loop reactor enhances the viscosity difference between the two polyethylene fractions. The reduced hydrogen transfer allows an increase in the molecular weight difference between the two fractions or permits a reduced amount of hydrogenation catalyst, for consuming the transferred hydrogen, to be required.

In preferred aspects, the critical temperature and the critical pressure of the supercritical fluid can be varied by mixing lower boiling point hydrocarbons, e.g. methane or ethane with propane or isobutane. Propane and ethane have progressively lower critical temperatures, but higher critical pressures than isobutane. The supercritical fluid may comprise a mixture of such hydrocarbons so that for some given apparatus, which is configured to operate at particular temperatures and pressure, supercriticality of the diluent can be achieved by altering the composition of the supercritical fluid. Thus the pressure of the supercritical fluid can be altered for optimising the operation of the reactor pump of the loop reactors. If ethane is mixed with the isobutane or with propane, the critical point is reached at a lower temperature, reducing any temperature problems caused by melting of the polyethylene polymer and allows the apparatus to operate under lower operating temperatures. In addition, both hydrogen and ethylene when present in the reactor in the supercritical fluid affect the critical temperature and critical pressure of the supercritical fluid. Thus the composition of the diluent, as well as the amounts of hydrogen and ethylene present in the reactors, can be varied in order to ensure that supercriticality is achieved with a given apparatus operating under particular pressure and temperature ranges. The critical point can be fine-tuned by addition of low boiling hydrocarbons, including methane and ethane. The diluent may comprise a mixture of propane, ethane and olefin monomer.

For polypropylene the use of a supercritical diluent with settling legs in the first reactor allows to transfer a lot of fluff with a minimum amount of liquid. Accordingly, the second reactor may be fed with additional cocatalyst and/or electron donor, which can then be different from the cocatalyst and/or electron donor fed in the first reactor. This allows running of the two reactors quite independently, what is not possible if the fluff is simply transferred through, for example, a horizontal pipe, without a concentrating device in accordance with the invention.

For making low density polyethylene containing high amounts of incorporated hexene comonomer, the hexene/ethylene ratio in the reactor has to be high. Since the critical temperature Tc of the hexene is high, the hexene concentration will be limited, but can be increased if ethane is added to a propane diluent for example. By mixing hydrocarbons, the critical point of the diluent can be fine-tuned, and a higher hexene concentration can be reached without leaving the supercritical state. By lowering the critical point, a higher comonomer concentration can be achieved, with a higher catalyst productivity. This causes larger polyethylene particle sizes in the reactor to be formed, giving improved settling. This in turn provides an improved reactor throughput, with increased economy in recycling.

In the supercritical fluid, the diffusion rate of the reactants is significantly higher than in the liquid, typically up to about 200 times faster. This in turn can increase the degree of polymerisation.

The present invention will now be illustrated in greater detail with reference to the following non-limiting Examples.

EXAMPLE 1

Comparative Example 1

In Comparative Example 1 a bimodal resin was produced in two reactors (abbreviated Rx in Tables 1 and 2) in series under the conditions specified in Table 1. For Example 1, the corresponding conditions were calculated for producing such a bimodal resin in the same reactor system. It will be seen that for both Example 1 and Comparative Example 1, there was a relatively high amount of comonomer, in the form of hexene, present in the first reactor as compared to that present in the second reactor whereby a low density fraction was produced in the first reactor and a high density fraction was produced in the second reactor. In the manufacture of the polyethylene resin of Example 1, it may be seen that a reduced hexene concentration is present in the second reactor as compared to Comparative Example 1, this yielding a greater density differential between the first and second fractions than for Comparative Example 1. It may be seen that Example 1 also exhibits increase settling efficiency of the polyethylene fluff as a result of the use of the supercritical diluent. Moreover, the feed rate of diluent into the second reactor is less for Example 1 than for Comparative Example 1. In addition, the catalyst productivity for Example 1 is significantly higher than that for Comparative Example 1.

TABLE 1

| | | Comparative Example 1 Resin 1: Liquid diluent in first Rx | | Example 1 Resin 2: Super critical diluent in first Rx | |
|---|---|---|---|---|---|
| | Units | 1st Rx | 2nd Rx | 1st Rx | 2nd Rx |
| PE production rate | T/h | 2 | 4 | 2 | 4 |
| Ethylene concentration | % wt | 1 | 2 | 0.8 | 4 |
| Hexene concentration | % wt | 3.5 | 1 | 3.3 | 0.5 |
| Reactor temperature | ° C. | 80 | 90 | 95 | 90 |
| Settling efficiency | T/T | 0.6 | 0.7 | 1.8 | 0.9 |
| Diluent feed rate | T/h | 3.3 | 5.7 | 1.1 | 4.4 |
| Catalyst Productivity | g/g | 7000 | 14000 | 14000 | 28000 |
| Hexene transferred | kg/h | 115 | | 36 | |
| Density | g/l | 928 | 950 | 926 | 950 |

The creep properties of the resins was determined using a full notch creep test (FNCT) which is used mainly in Europe by resin producers for development purposes. Depending on the selected test conditions, the rupture time can be strongly reduced, such that information can be obtained on highly resistant materials in a short time. The test equipment is simple, being the usual set-up for a tensile creep test. In the test, a sample is immersed in water or a specified surfactant solution at 80° C. or 95° C. A constant load is applied to the sample (a small bar–10×10×100 mm) and the sample is notched on four sides perpendicularly to the stress direction. The time to rupture is recorded as a function of the applied stress. The test method has been standardised in Japan (JIS K 6774). With reference to the present invention, the conditions applied were:

a 10×10×100 mm bar sample notched on four sides with a razor blade to a depth of 1.6 mm was immersed in a solution of 2% by weight Arkopal® N-100 (Hoechst commercial product) at 95° C. (±0.5° C.) and a constant stress load of 4.0 MPa applied based on the initial remaining cross section at the place where the notches were introduced.

A full notch creep test (FNCT) on Resin 1 gave times before fracture of between 200 and 300 hours. In contrast for the Resin 2, the time before fracture was largely improved and reached 600 to 1000 hours. This shows that the use of supercritical diluent in accordance with the invention gives resins with improved mechanical properties.

EXAMPLE 2

Comparative Example 2

In these Examples, a bimodal polyethylene resin was produced using the conditions shown in Table 2. These Examples are different from Example 1 and Comparative Example 1 in that the relatively low density polyethylene fraction is produced in the second reactor, and the relatively higher density polyethylene fraction is produced in the first reactor. In order that the low density fraction having a high degree of comonomer incorporation must be produced in the second reactor, hydrogen needed to be consumed either between the two reactors or in the second reactor by the use of a costly hydrogenating catalyst. The use of a supercritical diluent in the first reactor allowed a very significant economy of such a hydrogenation catalyst because very little hydrogen transferred from the first reactor to the second reactor. For metallocene catalysts the process using supercritical diluent permits the production of higher molecular weight in the second reactor even without the use of special hydrogenating catalysts. Furthermore, if the consumption of the hydrogen is performed in the second reactor, a second significant amount of hexene undergoes hydrogenation, which increases the production costs. Accordingly, the minimisation of the amount of hydrogen is thus important for obtaining improved process economics. It may be seen for Example 2 that the settling efficiency is higher, and the diluent feed rate is lower, for the first reactor of Example 2 as compared to that for the first reactor of Comparative Example 2.

TABLE 2

|  | units | Comparative Example 2 Resin 1: Liquid diluent in first Rx | | Example 2 Resin 2: Super critical diluent in first Rx | |
| --- | --- | --- | --- | --- | --- |
|  |  | 1st Rx | 2nd Rx | 1st Rx | 2nd Rx |
| PE production rate | T/h | 2 | 4 | 2 | 4 |
| Ethylene concentration | % wt | 2 | 2 | 2 | 2 |
| Hexene concentration | % wt | 0 | 7 | 0 | 7 |
| Hydrogen concentration | % vol | 1 | 0 | 1 | 0 |
| Reactor temperature | ° C. | 100 | 85 | 105 | 85 |
| Settling efficiency | T/T | 0.6 | 0.7 | 1.8 | 0.7 |
| Diluent feed rate | T/h | 3.3 | 5.7 | 1.1 | 5.7 |
| Hydrogen transferred | kg/h | 1.14 |  | 0.38 |  |
| Density | g/l | >970 | 950 | >970 | 950 |

What is claimed is:

1. A process for producing polyolefins having a bimodal molecular weight distribution, the process comprising producing a first polyolefin fraction in the presence of a catalyst in a first loop reactor, and producing a second polyolefin fraction in the presence of the catalyst in a second loop reactor which is serially connected to and downstream of the first loop reactor, the first and second polyolefin fractions being blended in the second loop reactor to form a polyolefin having a bimodal molecular weight distribution, at least the first loop reactor containing a diluent under supercritical conditions which is circulated around the loop of the reactor, and wherein at least the first loop reactor is provided with a fluff concentrating device fluidly connected to the loop and in which polyolefin fluff of the first fraction is concentrated in the supercritical diluent, and polyolefin fluff of the first polyolefin fraction is transferred together with an amount of supercritical diluent from the fluff concentrating device of the first loop reactor into the second loop reactor.

2. A process according to claim 1 wherein the fluff concentrating device is selected from one or a combination of a downwardly depending settling leg, a cyclone or hydrocyclone and a centrifuge.

3. A process according to claim 1 wherein the fluff concentrating device includes a valve for permitting an amount of the polyolefin fluff together with an amount of the supercritical diluent periodically to be removed from the fluff concentrating device.

4. A process according to claim 1 wherein the diluent comprises at least one alkane having from 1 to 4 carbon atoms or propylene.

5. A process according to claim 4 wherein the diluent comprises isobutane.

6. A process according to claim 1 wherein the pressure of the supercritical diluent is from 37 to 100 bars.

7. A process according to claim 1 wherein the temperature of the supercritical diluent is from 70 to 140° C.

8. A process according to claim 1 wherein the diluent in the second loop reactor is operated under supercritical conditions and the second loop reactor is provided with a respective fluff concentrating device.

9. A process according to claim 8, further comprising recycling back into the first and second loop reactors any diluent removed from the fluff concentrating device of the second loop reactor on removal of polyolefin fluff therefrom.

10. A process according to claim 1 wherein the diluent in the second loop reactor is operated under liquid conditions and the second loop reactor is provided with a respective fluff concentrating device.

11. A process according to claim 1 wherein the use of the diluent under supercritical conditions in at least the first loop reactor increases the settling of polyolefin fluff in the respective fluff concentrating device of at least the first loop reactor.

12. A process according to claim 1 wherein the use of the diluent under supercritical conditions in at least the first loop reactor reduces the amount of comonomer in solution in the diluent transferred from the first loop reactor to the second loop reactor.

13. A process according to claim 1 wherein the use of the diluent under supercritical conditions in at least the first loop reactor reduces the amount of hydrogen in solution in the diluent transferred from the first loop reactor to the second loop reactor.

14. A process according to claim 9 wherein the use of the diluent under supercritical conditions in the first and second loop reactors reduces the amount of diluent to be recycled back into the loop reactors following removal of a mixture of polyolefin fluff and diluent from the fluff concentrating device of the second loop reactor.

* * * * *